(12) United States Patent  (10) Patent No.:     US 6,681,192 B2
     Ballantyne                (45) Date of Patent:     Jan. 20, 2004

(54) SYSTEMS AND METHODS FOR FAST TIMER CALIBRATION

(75) Inventor: Joseph Cox Ballantyne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 09/961,785

(22) Filed: Sep. 24, 2001

(65) Prior Publication Data

US 2002/0038190 A1 Mar. 28, 2002

Related U.S. Application Data

(60) Provisional application No. 60/234,957, filed on Sep. 23, 2000.

(51) Int. Cl.$^7$ .......................... G01D 18/00; G06F 19/00
(52) U.S. Cl. ...................... 702/107; 702/106; 377/20; 327/291; 714/55; 714/727; 714/731
(58) Field of Search ................................ 702/107, 106, 702/89; 714/10, 47, 55, 727, 731, 744, 814; 327/291, 292, 296; 377/20

(56) References Cited

U.S. PATENT DOCUMENTS 5,502,812 A * 3/1996 Leyre et al. .................. 714/10
6,169,502 B1 * 1/2001 Johnson et al. ............. 341/120

* cited by examiner

Primary Examiner—John Barlow
Assistant Examiner—Hien Vo
(74) Attorney, Agent, or Firm—Lee & Hayes, PLLC

(57) ABSTRACT

Systems and methods for efficiently and accurately determining a speed of a faster clock having unknown frequency using a slower clock having a known frequency. A series of measurement pairs are taken from the clocks; each measurement pair including one measurement from the slower clock and one measurement—at the same time—from the faster clock. A lower bound and an upper bound for the measurement pairs are determined. The lower bound and the upper bound are averaged to derive a calibration variable that indicates a number of clock cycles that occur on the faster clock during one cycle of the slower clock. The calibration variable is used to time various processes in a computer system.

44 Claims, 3 Drawing Sheets

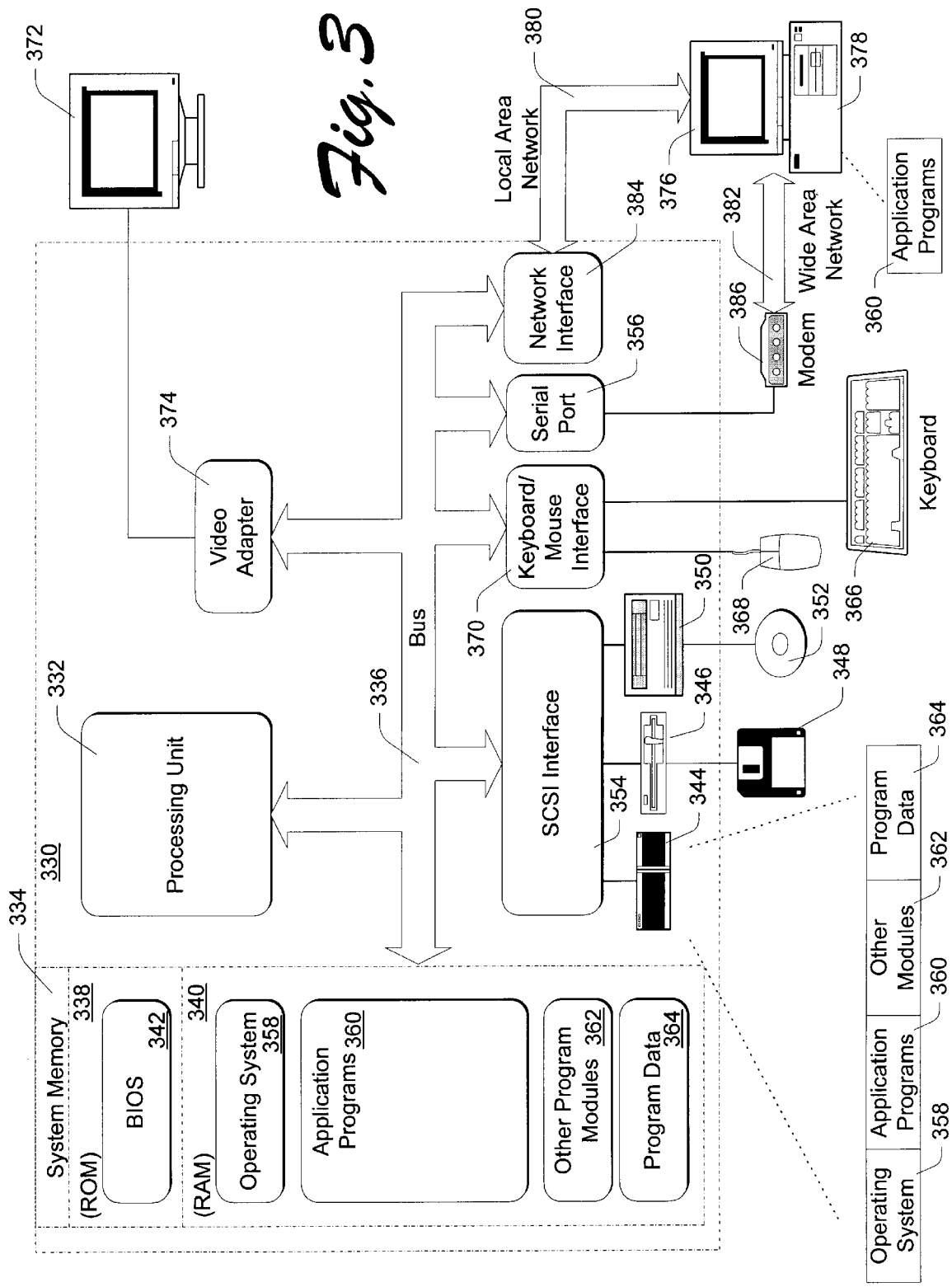

SYSTEMS AND METHODS FOR FAST TIMER CALIBRATION

RELATED APPLICATIONS

This application claims the benefit of U.S. Provisional Application No. 60/234,957, filed Sep. 23, 2000.

TECHNICAL FIELD

The present invention relates to timers for computing systems. More particularly, the present invention relates to fast timer calibration, using a first timer running at a known speed to calibrate a second timer running at an unknown speed.

BACKGROUND

A computer system includes many different clocks (clocks, timers, counters, etc.) that are used by various processes to coordinate execution of instructions by the computer system. For example, a typical personal computer system may contain several of the following: an 8254 motherboard timer, a CMOS (complementary metal-oxide semiconductor) real-time clock, a central processing unit (CPU) cycle or timestamp counter, CPU performance counters (2), an APCI (advanced programmable interrupt controller) timer, a system bus clock, a local APIC (application-layer protocol control information) timer, etc. Some of these clocks are driven off of different crystals and, therefore, will not be exactly synchronized with each other.

There are many existing clock calibration methods that use a known clock to measure another clock. However, a problem exists with the known methods in that the calibration must be performed over a relatively long period to get acceptable accuracy. This is because the longer a time period in which calibration measurements are taken, the more accurate the calibration will be.

In today's environment of faster processor speeds and more precise execution timing requirements, there is a need for a precise clock calibration method that can be performed in a relatively short time period.

Consider real-time scheduling for example, wherein a real-time scheduler uses performance counters to drive the scheduler. A typical scheduler is designed to run all non-blocking threads for the same amount of time. However, the threads may not require all the scheduled time to run. To increase performance, a real-time scheduler is designed to run threads for the time required by the thread, up to a maximum time allotted by the real-time scheduler. However, for a real-time scheduler to function efficiently, different clock provided by a system must be calibrated so that scheduled events can be assured of occurring when the real-time scheduler expects them to be.

A real-time scheduler normally runs threads for somewhere between 500 nanoseconds (ns) and 500 microseconds (usec). The scheduler is also designed to run threads for different lengths of time; each thread is scheduled to run a fraction of every millisecond. The fraction the thread is allotted is determined by the percentage CPU reserved for that thread.

Because a real-time scheduler schedules threads to run in sub-ms time periods, it requires an accurate estimate of the speed of the clock driving the performance counters that it uses to generate the interrupts that drive the schedule. In addition, it is advantageous that adequate calibration can be accomplished within a relatively short period of time to accommodate more sophisticated systems.

SUMMARY

Systems and methods for fast timer calibration are described, wherein a first clock of a known speed is used to calibrate a second clock of unknown speed. The calibration can be done in a relatively short period of time and the first clock can run at a slower speed than the second clock. As used herein, the terms timer, clock and counter are interchangeable and are used to define a crystal oscillator used to generate a periodic electronic pulse that is used to drive a counter that counts either single or multiple clock pulses. All of these clocks or counters can be read, and can therefore be related to each other.

In a real-time scheduling system, performance counters can be set up to count cycles just like a timestamp counter of a processor. By calibrating the clock speed driving both sets of counters (performance and timestamp) the performance counters can be set up to generate interrupts for desired lengths of time. The real-time scheduler uses the performance counters to generate interrupts with potentially very short times between interrupts.

In one implementation, a first clock is used to calibrate a second clock that operates at a higher frequency. Over a short period of time, a series of measurement pairs are taken, each measurement pair including a measurement from the first clock and a measurement from the second clock taken as close together as possible. The series of measurement pairs are then stored in memory.

For each of the measurement pairs for which it is possible, a partial lower bound is derived that indicates a minimum number of second clock cycles that occur during a first clock cycle. Similarly, for each of the measurement pairs for which it is possible, a partial upper bound is derived that indicates a maximum number of second clock cycles that occur during a first clock cycle.

From the partial lower bounds and partial upper bounds, a lower and upper bound for the series of measurement pairs is derived. This can be done in several ways, e.g., taking an average or median of the lower and upper bounds, or taking a minimum partial lower bound for the lower bound of the series and taking a maximum partial upper bound for the upper bound of the series.

Once a lower bound and an upper bound have been derived for the series of measurement pairs, the lower bound and upper bound are used to calculate a calibration variable that indicates the number of cycles that occur on the second clock during one cycle of the first clock. In one implementation, the calibration variable is derived by taking an average of the lower bound and the upper bound.

One advantage realized by the invention described herein is that it can calibrate a faster clock in relation to a slower clock in a relatively short period of time. For example, to take ten measurement pairs from a clock running at one megahertz, only ten microseconds are required.

In one example of one implementation, to quickly calibrate a CPU cycle counter, several measurements from a motherboard timer running at a known nominal speed of 1.193182 MHz can be taken in a short time period (approximately 10 msec). The measurements are used as described above to accurately estimate a clock speed of the CPU cycle counter

BRIEF DESCRIPTION OF THE DRAWINGS

FIG. 3 is a diagram of a computer system that can be used to implement various aspects of various implementations of the invention.

DETAILED DESCRIPTION

Overview

In the described implementations, systems and methods are provided for using a first clock that operates at a known frequency to calibrate a second clock that is operating at an unknown frequency. The implementations are an improvement over previous systems because the implementations describe a way in which a relatively slow clock can be used to calibrate a faster clock in a relatively short period of time. Previously, calibrating a fast clock required a relatively long period of time to obtain an accurate calibration estimate.

Using the implementations described herein, an accurate measure of the number of cycles that occur on the second clock during a cycle that occurs on the first clock can be obtained in a short period of time, e.g., five to twenty microseconds. As a result, CPU performance counters can be calibrated so that the exact timing of CPU instructions as required for accurate real-time scheduling of instructions and threads.

A series of measurement pairs are taken, each measurement pair including one measurement from a first clock of a known frequency and one measurement from a second clock of an unknown frequency. Several measurement pairs are taken and stored in memory. After a pre-determined number of measurement pairs are taken, a lower bound and an upper bound are derived for the measurement pairs. This may be done in any one of several ways. In one implementation, a partial lower bound and a partial upper bound are derived for each measurement pair. The lower bound and the upper bound of the series of measurement pairs is then determined from the partial lower bounds and partial upper bounds, such as by taking an average of the partial lower and upper bounds, taking a median of the partial lower and upper bounds, taking a minimum and a maximum of the partial lower bounds and partial upper bounds, respectively, etc.

A calibration variable is derived from the lower bound and upper bound of the series of measurement pairs. As described herein, this is accomplished by taking an arithmetic mean (average) of the lower bound and the upper bound for the series of measurement pairs to determine how many times the faster clock cycles during each cycle of the first clock. As will be described below, the error that may be encountered using the described implementations ranges from very low to zero.

The claimed invention includes other features and aspects that will be discussed in greater detail below.

Exemplary Computer System

Figure 1:
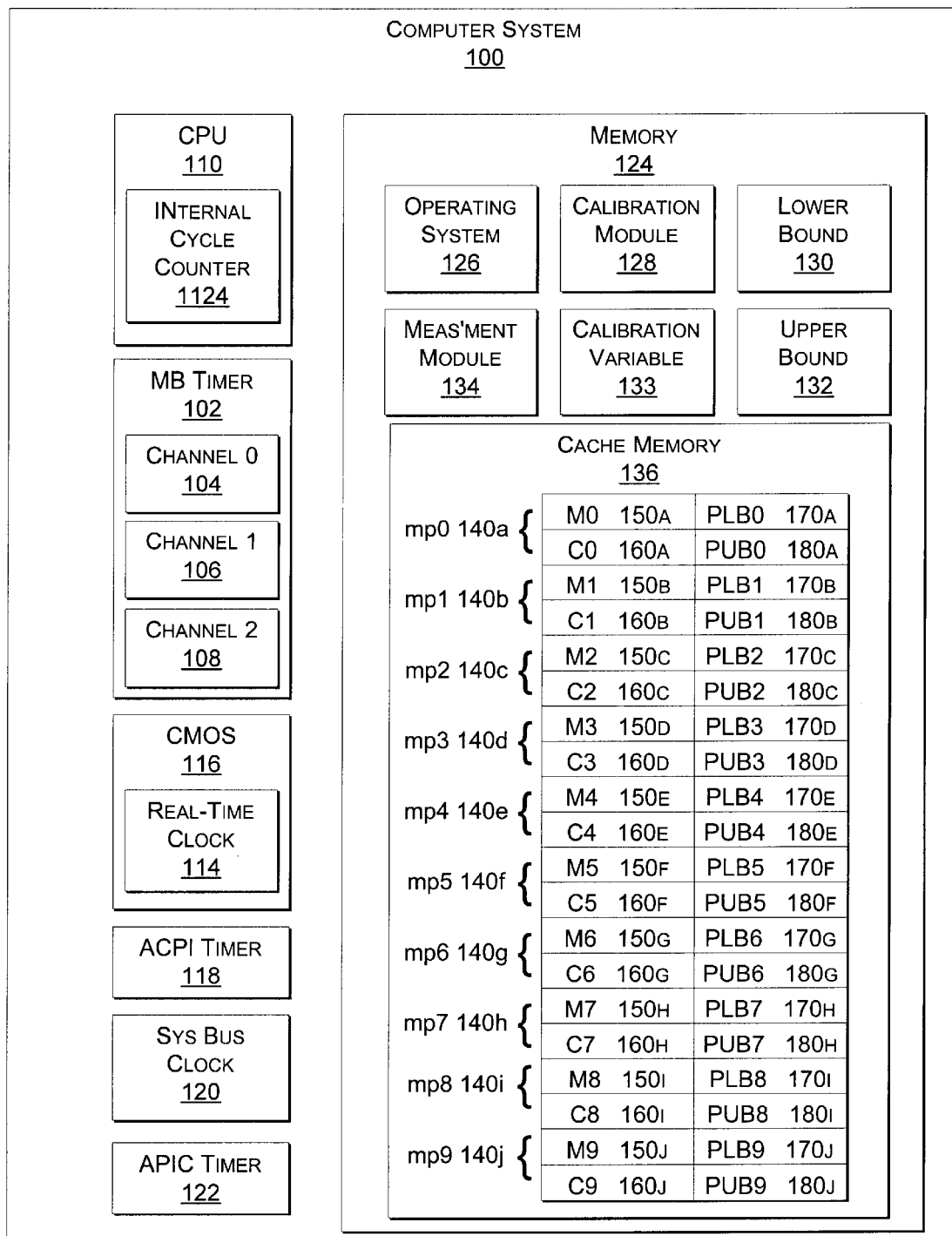
FIG. 1 is a block diagram of an exemplary computer system on which at least one embodiment of the invention may be implemented.

FIG. 1 is a block diagram of a computer system 100 on which the present invention may be implemented. The computer system 100 includes a motherboard timer 102 that operates at a first frequency. The motherboard timer includes three channels: channel zero 104, channel one 106 and channel two 108. The computer system 100 also includes a central processing unit 110 (CPU) having an internal cycle counter 112 that operates at a second frequency that is faster than the first frequency.

Other clocks (or timers or counters—all used interchangeably herein) included in the computer system 100 includes a real-time clock 114 in a CMOS (complementary metal-oxide semiconductor) 116, an ACPI (advanced programmable interrupt controller) timer 118, a system bus clock 120 and an APIC (application-layer protocol control information) timer 122.

The computer system 100 also includes memory 124, which stores an operating system 126, a calibration module 128, a lower bound 130, an upper bound 132, a calibration variable 133 and a measurement module 134. Cache memory 136 of the computer system 100 stores a series of measurement pairs 140. Each measurement pair 140$a$–140$j$ ($mp_0$140 through $mp_9$) includes a first measurement 150$a$–150$j$ ($m_0$ through $m_9$) from the motherboard timer 102 and a second measurement 160$a$–160$j$ ($c_0$ through $c_9$) from the internal cycle counter 112 of the CPU 110. The measurements 150, 160 in each measurement pair 140 are taken at the same time. The cache memory 136 also stores a partial lower bound 170$a$–170$j$ and a partial upper bound 180$a$–180$j$ for each measurement pair 140.

The functionality of the elements depicted in FIG. 1 will be discussed in greater detail, below, with respect to the following figures. Continuing reference will be made to the elements and reference numerals shown in FIG. 1.

Methodological Implementation: Fast Timer Calibration

Figure 2:
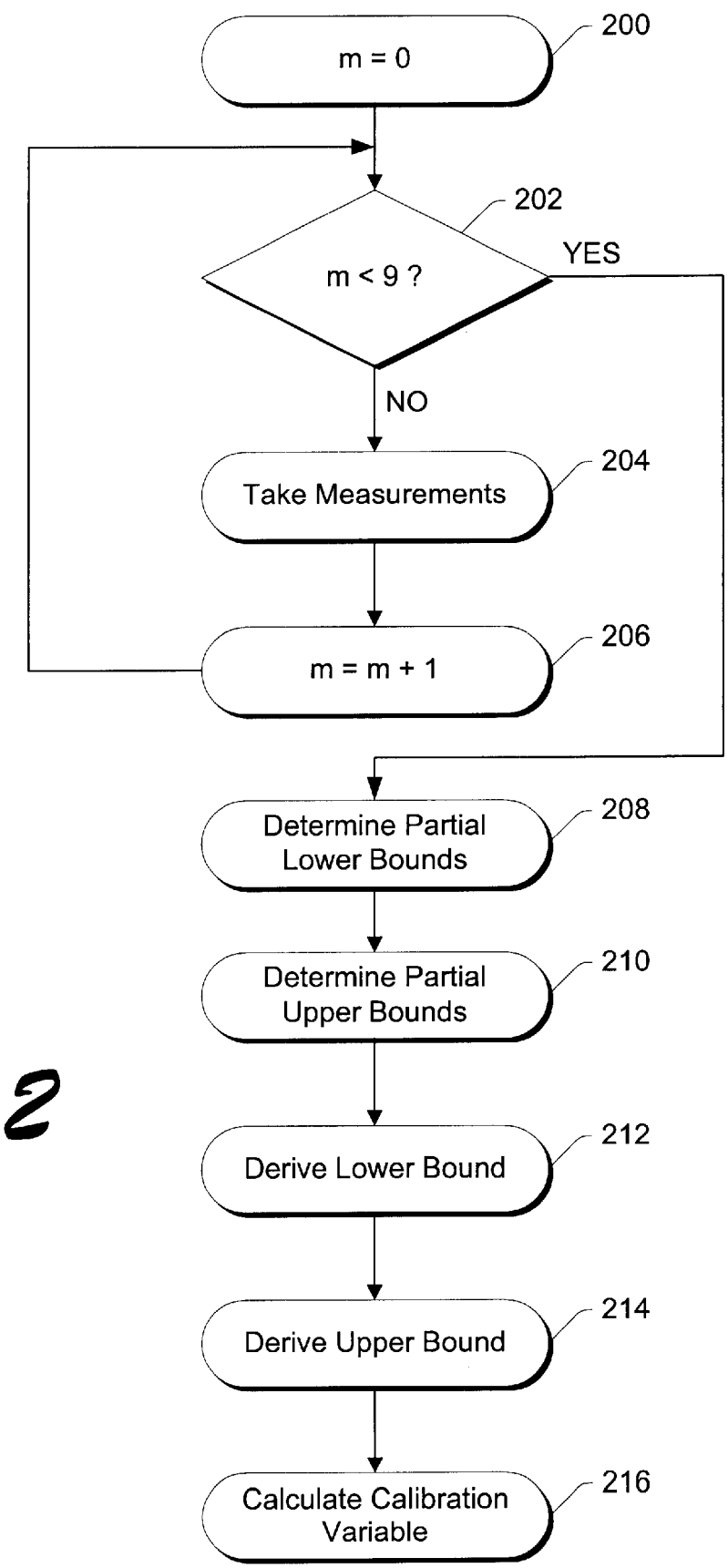
FIG. 2 is a flow diagram that depicts a method for fast timer calibration.

FIG. 2 is a flow diagram depicting a methodological implementation of a fast timer calibration system. Blocks 200, 202, 204 and 206 depict the construction of the series of measurement pairs 140. At block 200 a count is initialed to zero. If the count is less than the number of measurement pairs to be recorded—in this case nine (for zero to ten pairs) ("No" branch, block 202), then a motherboard timer measurement 150 and an internal cycle counter measurement 160 are taken at the same time and stored in cache memory 136 and the count is incremented. This process repeats until the desired number of measurement pairs 140 is collected.

If the measurement pair 140 collection is complete ("Yes" branch, block 202), then a partial lower bound 170 is determined for each of the measurement pairs 140 (block 208). In one implementation, a partial lower bound 170 for a measurement pair 140 is determined from the following equation:

$$PLB_{mp(x)} = c_{(x)} - c_{(x-1)} / m_{(x+1)} - m_{(x-1)}$$

where x is a current index, $PLB_{mp(x)}$ is the partial lower bound 170 for current index, c is the measurement taken from the internal cycle counter 112 of the CPU 110, and m is the measurement taken from the motherboard timer 102, and when taking the measurements we read first m and then c. Note that we will not be able to calculate a partial lower bound for every pair of measurements because if one of the measurements is the first measurement taken, there is no previous measurement. For those boundary cases, the partial lower bound is simply not calculated.

At block 210, a partial upper bound 180 for a measurement pair 140 is determined from the following equation:

$$PUB_{mp(x)} = c_{(x+1)} - c_{(x-1)} / m_{(x+1)} - m_{(x)}$$

where x is a current index, $PUB_{mp(x)}$ is the partial upper bound 180 for current index, c is the measurement taken from the internal cycle counter 112 of the CPU 110, and m is the measurement taken from the motherboard timer 102, and again when taking the measurements we read first m and then c. Note that for the same cases when we could not calculate a partial lower bound we will not be able to calculate a partial upper bound. For these cases, the partial upper bound is simply not calculated. Note that because the cases for which we don't have the required measurements match, we will end up with the same number of partial lower and partial upper bounds.

One advantage of making the clock estimate in this fashion is that if N measurement pairs have been taken, each additional measurement pair adds N-2 combinations of measurement pairs from which the partial upper and partial lower bound calculations can be made. The number of partial upper and partial lower bound estimates grows very rapidly as additional measurements are taken. This is another reason why this measurement technique is so quick—you don't have to take lots of measurements to end up with lots of combinations which generate partial upper and partial lower bounds.

Once a partial lower bound 170 and a partial upper bound 180 have been determined for each measurement pair 140, the lower bound 130 is derived from the partial lower bounds 170 and the upper bound 132 is derived from the partial upper bounds 180 (block 212 and block 214). This may be accomplished in any of several ways.

In one implementation, the lower bound 130 is derived by taking an arithmetic mean of the partial lower bounds 170 and the upper bound 132 is derived by taking an arithmetic mean of the partial upper bounds 180. Instead of a mean, an arithmetic median of the partial lower bounds 170 and partial upper bounds 180 may be taken. In another implementation, a partial lower bound 170 having a minimum value of all partial lower bounds 170 is taken as the lower bound 130. Likewise, a partial upper bound 180 having a maximum value of all partial upper bounds 180 is taken as the upper bound 132. Any method known in the art for deriving a lower bound and an upper bound from the partial lower bounds 170 and the partial upper bounds 180 may be used.

Finally, at block 216, the calibration variable 133 is derived to determine how may cycles occur on the internal cycle counter 112 for each cycle that occurs on the motherboard timer 102. In one implementation, an arithmetic mean of the lower bound 130 and the upper bound 132 is taken as the calibration variable 133.

In another implementation, a lower bounds histogram of the partial lower bounds 170 and an upper bounds histogram of the partial uppers bounds 180 are created. The best estimate of the calibration variable 133 in this case is when the probability that the estimate is below the lower bound equals the probability that the estimate is above the upper bound. In an ideal case, the two histograms will not cross, and then that probability will be zero. In most cases, the two histograms will overlap and balancing the two error probabilities will obtain the best estimate for the calibration variable 133. One error probability is the probability that the estimate is too low; the other error probability is the probability that the estimate is too high.

Once the calibration variable 133 has been determined, processes executed by the computer system 100 can be timed with greater accuracy and can provide more accurate results efficiently.

It is noted that the measurement pairs 140 are taken prior to processing any measurements. This adds to the efficiency of the model, because several measurement pairs can be taken in a short period of time. For example, if the motherboard timer 102 is a PC motherboard timer chip 8254 that runs at a known nominal frequency of 1.193182 MHz, then ten measurement pairs 140 can be taken in approximately ten microseconds. In a preferred implementation, the measurement pairs 140 are taken in a time period of between five and twenty microseconds.

In case absolute certainty about the estimate is desired, it is possible to run the clock estimate multiple times in sequence, and build a histogram of the resulting output. After some number of clock estimates has been made, a peak search on the histogram can be made, and the resulting value for the clock—the value which produced the peak on the histogram—can be used as the final estimate. Note that since this clock measurement code takes on the order of a few microseconds, a thousand estimates can be produced in just a few milliseconds. Those estimates build up a histogram from which an extremely reliable estimate of the clock frequency can be made. To build the histogram, simply allocate enough memory to be able to handle the maximum possible clock, and for each clock estimate if it is not above the maximum value allocated, increment that slot of the histogram. After all the measurements have been taken, scan the histogram for the peak value. Note that the clock estimate algorithm described here produces very sharp histogram peaks. As an optimization, when scanning the histogram, keep track of the total number of measurements counted by the histogram so far, and quit as soon as that total matches the number of measurements taken. This will allow the code to stop before it has scanned every possible clock value in the histogram.

Specifics of Exemplary System

As a specific practical example, assume the motherboard timer 102 is a PC motherboard time chip 8254 that runs at a known nominal frequency of 1.193182 MHz and that the internal cycle counter 112 of an Intel processor that operates at a much higher frequency (up to 1+ GHz). Typically, channel two 108 of the motherboard timer 102 will be used, since this channel is often used much less than channel zero 104 or channel one 106. In addition, channel 2 can be read with fewer instructions than the other channels of the motherboard timer—it can be read with a single input/output (I/O) instruction. The other channels may require 1 output and 2 addition input I/O instructions to be read. Since each I/O instruction takes on the order of 500 ns or 0.5 usec to run, reducing the number of required I/O instructions is very important to minimizing the calibration time.

An rdtsc instruction is used to gather the measurements from the internal cycle counter 112. Although not required, instruction execution may be serialized prior to running the rdtsc instruction to increase the predictability of the time between an I/O read and the read timestamp instruction required to measure the motherboard timer 102. The fastest serialization instruction available are used, which for the Pentium processor is not cupid, but rather a sidt, lidt pair. Interrupts should be turned off while taking the measurements to decrease the likelihood of random delays in reads. Furthermore, all of the functions used to read the clocks are executed before entering the main measurement loop. This ensures that they are in the cache of the computer and minimizes variation in the execution time of the main measurement loop.

Exemplary Computer System

FIG. 3 shows an exemplary computer system that can be used to implement various computing devices, i.e., client computers, servers and the like, in accordance with the described implementations and embodiments.

Computer 300 includes one or more processors or processing units 302, a system memory 304, and a bus 306 that couples various system components including the system memory 304 to processors 302. The bus 306 represents one or more of any of several types of bus structures, including a memory bus or memory controller, a peripheral bus, an accelerated graphics port, and a processor or local bus using any of a variety of bus architectures. The system memory 304 includes read only memory (ROM) 308 and random access memory (RAM) 310. A basic input/output system (BIOS) 312, containing the basic routines that help to transfer information between elements within computer 300, such as during startup, is stored in ROM 308.

Computer 300 further includes a hard disk drive 314 for reading from and writing to a hard disk (not shown), a magnetic disk drive 316 for reading from and writing to a removable magnetic disk 318, and an optical disk drive 320 for reading from or writing to a removable optical disk 322 such as a CD ROM or other optical media. The hard disk drive 314, magnetic disk drive 316, and optical disk drive 320 are connected to the bus 306 by an SCSI interface 324 or some other appropriate interface. The drives and their associated computer-readable media provide nonvolatile storage of computer-readable instructions, data structures, program modules and other data for computer 300. Although the exemplary environment described herein employs a hard disk, a removable magnetic disk 318 and a removable optical disk 322, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 314, magnetic disk 318, optical disk 322, ROM 308, or RAM 310, including an operating system 328, one or more application programs 330, other program modules 332, and program data 334. A user may enter commands and information into computer 300 through input devices such as a keyboard 336 and a pointing device 338. Other input devices (not shown) may include a microphone, joystick, game pad, satellite dish, scanner, or the like. These and other input devices are connected to the processing unit 302 through an interface 340 that is coupled to the bus 306. A monitor 342 or other type of display device is also connected to the bus 306 via an interface, such as a video adapter 344. In addition to the monitor, personal computers typically include other peripheral output devices (not shown) such as speakers and printers.

Computer 300 commonly operates in a networked environment using logical connections to one or more remote computers, such as a remote computer 346. The remote computer 346 may be another personal computer, a server, a router, a network PC, a peer device or other common network node, and typically includes many or all of the elements described above relative to computer 300, although only a memory storage device 348 has been illustrated in FIG. 3. The logical connections depicted in FIG. 3 include a local area network (LAN) 350 and a wide area network (WAN) 352. Such networking environments are commonplace in offices, enterprise-wide computer networks, intranets, and the Internet.

When used in a LAN networking environment, computer 300 is connected to the local network 350 through a network interface or adapter 354. When used in a WAN networking environment, computer 300 typically includes a modem 356 or other means for establishing communications over the wide area network 352, such as the Internet. The modem 356, which may be internal or external, is connected to the bus 306 via a serial port interface 326. In a networked environment, program modules depicted relative to the personal computer 300, or portions thereof, may be stored in the remote memory storage device. It will be appreciated that the network connections shown are exemplary and other means of establishing a communications link between the computers may be used.

Generally, the data processors of computer 300 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

The above-described methods and systems provide a mechanism for calibrating a clock of an unknown speed with a clock of known speed. Several clocks may be calibrated with the clock of known speed to improve system timing of process execution. The calibration can be completed in a relatively short period of time compared to known methods.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for using a first clock to calibrate a second clock, comprising:

taking a series of measurement pairs, each measurement pair including a first clock measurement and a second clock measurement, the series of measurement pairs including an initial measurement pair, a final measurement pair taken at a later time than the initial measurement pair, and at least one intermediate measurement pair taken at a later time than the initial measurement pair and at an earlier time than the final measurement pair;

for each measurement pair, determining a lower bound that indicates a minimum possible number of clock cycles that can occur on the second clock relative to one or more clock cycles that occur on the first clock;

for each measurement pair, determining an upper bound that indicates a maximum possible number of clock cycles that can occur on the second clock relative to one or more clock cycles that occur on the first clock; and using the lower bound and the upper bound to determine a calibration variable that indicates a number of second clock cycles that occur during one or more first clock cycles.

2. The method as recited in claim 1, wherein the first clock is slower than the second clock.

3. The method as recited in claim 1, wherein the first clock further comprises a motherboard clock of a personal computer (the 8254 motherboard timer).

4. The method as recited in claim 1, wherein the first clock further comprises a computer chip clock running at a nominal frequency of approximately 1.193182 million cycles per second.

5. The method as recited in claim 1, wherein the series of measurement pairs further comprises multiple intermediate measurement pairs.

6. The method as recited in claim 1, wherein the series of measurement pairs further comprises at least eight intermediate measurement pairs.

7. The method as recited in claim 1, wherein the series of measurement pairs are taken over a time period of less than twenty microseconds.

8. The method as recited in claim 1, wherein the series of measurement pairs are taken over a time period between five and fifty microseconds.

9. The method as recited in claim 1, wherein the determining a lower bound further comprises determining a partial lower bound for each measurement pair and determining the lower bound by determining an arithmetic mean of the partial lower bounds.

10. The method as recited in claim 1, wherein the determining a lower bound further comprises determining a partial lower bound for each measurement pair and determining the lower bound by determining an arithmetic median of the partial lower bounds.

11. The method as recited in claim 1, wherein the determining a lower bound further comprises identifying a lower bound having a minimum value as the lower bound for the series of measurement pairs.

12. The method as recited in claim 1, wherein the determining an upper bound further comprises determining a partial upper bound for each measurement pair and determining the upper bound by determining an arithmetic mean of the partial upper bounds.

13. The method as recited in claim 1, wherein the determining an upper bound further comprises determining a partial upper bound for each measurement pair and determining the upper bound by determining an arithmetic median of the partial upper bounds.

14. The method as recited in claim 1, wherein the determining an upper bound further comprises identifying an upper bound having a maximum value as the upper bound for the series of measurement pairs.

15. The method as recited in claim 1, wherein:
the determining a lower bound further comprises determining a partial lower bound for each measurement pair and determining the lower bound by determining an arithmetic mean of the partial lower bounds;
the determining an upper bound further comprises determining a partial upper bound for each measurement pair and determining the upper bound by determining an arithmetic mean of the partial upper bounds; and
the determining a calibration variable further comprises determining an arithmetic mean of the lower bound and the upper bound.

16. The method as recited in claim 1, wherein:
the determining a lower bound further comprises determining a partial lower bound for each measurement pair and determining the lower bound by determining an arithmetic median of the partial lower bounds;
the determining an upper bound further comprises determining a partial upper bound for each measurement pair and determining the upper bound by determining an arithmetic median of the partial upper bounds; and
the determining a calibration variable further comprises determining an arithmetic mean of the lower bound and the upper bound.

17. The method as recited in claim 1, wherein:
the determining a lower bound further comprises identifying a lower bound of a measurement pair that has a minimum value as the lower bound for the series of measurement pairs;
the determining an upper bound further comprises identifying an upper bound of a measurement pair that has a maximum value as the upper bound for the series of measurement pairs; and
the determining a calibration variable further comprises determining an arithmetic mean of the lower bound for the series of measurement pairs and the upper bound for the series of measurement pairs.

18. A computer system, comprising:
a main circuit board having at least one motherboard clock operating at a known frequency;
a processor having at least one internal cycle counter operating at an unknown frequency;
a measurement module configured to take a series of measurement pairs, each measurement pair including a measurement from the motherboard clock and a measurement from the internal cycle counter, the series of measurement pairs including an initial measurement pair, a final measurement pair, and at least one additional measurement pair;
memory to store the measurement pairs; and
a calibration module configured to determine a lower bound of the measurement pairs and an upper bound of the measurement pairs, and to calculate a calibration variable from the lower bound and the upper bound, the calibration variable indicating a number of internal cycle counter cycles that occur during one or more motherboard clock cycles.

19. The computer system as recited in claim 18, wherein the motherboard clock operates at a slower speed than the internal cycle counter.

20. The computer system as recited in claim 18, wherein the motherboard clock operates at a nominal frequency of approximately 1.193182 megahertz.

21. The computer system as recited in claim 18, wherein the series of measurements further comprises more than one intermediate measurement pair.

22. The computer system as recited in claim 18, wherein the series of measurements further comprises at least eight intermediate measurement pairs.

23. The computer system as recited in claim 18, wherein the series of measurement pairs is taken over a period of less than twenty microseconds.

24. The computer system as recited in claim 18, wherein the calibration module is further configured to determine a lower bound of the measurement pairs by:
determining a partial lower bound for each of the measurement pairs in the series of measurement pairs; and
determining a lower bound for the series of measurement pairs from the partial lower bounds for each of the measurement pairs.

25. The computer system as recited in claim 24, wherein the calibration module is further configured to determine the lower bound by deriving an arithmetic mean of the partial lower bounds.

26. The computer system as recited in claim 24, wherein the calibration module is further configured to determine the lower bound by deriving an arithmetic median of the partial lower bounds.

27. The computer system as recited in claim 24, wherein the calibration module is further configured to determine the lower bound by deriving a minimum value of the partial lowers bounds to be the lower bound.

28. The computer system as recited in claim 18, wherein the calibration module is further configured to determine an upper bound of the measurement pairs by:
   determining a partial upper bound for each of the measurement pairs in the series of measurement pairs; and
   determining an upper bound for the series of measurement pairs from the partial upper bounds for each of the measurement pairs.

29. The computer system as recited in claim 28, wherein the calibration module is further configured to determine the upper bound by deriving an arithmetic mean of the partial upper bounds.

30. The computer system as recited in claim 28, wherein the calibration module is further configured to determine the upper bound by deriving an arithmetic median of the partial upper bounds.

31. The computer system as recited in claim 28, wherein the calibration module is further configured to determine the upper bound by deriving a maximum value of the partial upper bounds to be the upper bound.

32. The computer system as recited in claim 18, wherein the memory further comprises cache memory, and wherein the measurement pairs are stored in the cache memory.

33. The computer system as recited in claim 18, wherein the measurement pairs in the series of measurement pairs are taken prior to determining the upper bound and the lower bound.

34. One or more computer-readable media containing computer-executable instructions that, when executed by a computer, perform the following steps:
   recording a series of measurement pairs, each measurement pair including a first clock measurement from a first clock and a second clock measurement from a second clock;
   determining a lower bound for each of the measurement pairs, each lower bound indicating a minimum number of second clock cycles, depending on the first clock measurement and the second clock measurement, that occur during one or more first clock cycles;
   determining an upper bound for each of the measurement pairs, each upper bound indicating a maximum number of second clock cycles, depending on the first clock measurement and the second clock measurement, that occur during one or more first clock cycles; and
   determining a calibration variable from the lower bounds and the upper bounds, the calibration variable indicating a number of second clock cycles that occur during a first clock cycle.

35. The one or more computer-readable media as recited in claim 34, wherein:
   each lower bound is a partial lower bound;
   each upper bound is a partial upper bound;
   wherein:
      the one or more computer-readable media further comprises determining a lower bound and an upper bound for the series of measurement pairs; and
      the determining a calibration variable from the lower bounds and the upper bounds further comprises determining a calibration variable from the lower bound of the series of measurement pairs and the upper bound of the series of measurement pairs.

36. The one or more computer-readable media as recited in claim 35, wherein the determining a lower bound and an upper bound for the series of measurement pairs further comprises deriving an arithmetic mean over the partial lower bounds and the partial upper bounds of the measurement pairs, respectively.

37. The one or more computer-readable media as recited in claim 35, wherein the determining a lower bound and an upper bound for the series of measurement pairs further comprises deriving an arithmetic median of the partial lower bounds and the upper bounds of the measurement pairs, respectively.

38. The one or more computer-readable media as recited in claim 35, wherein the determining a lower bound and an upper bound for the series of measurement pairs further comprises determining a minimum partial lower bound to be the lower bound, and determining a maximum partial upper bound to be the upper bound.

39. The one or more computer-readable media as recited in claim 35, wherein the calculating a calibration variable further comprises deriving an average of the lower bound and the upper bound for the series of measurement pairs.

40. The one or more computer-readable media as recited in claim 34, wherein the first clock comprises a motherboard clock of a personal computer.

41. The one or more computer-readable media as recited in claim 34, wherein the series of measurement pairs extend from an initial measurement pair at a first time to a final measurement pair at a later second time, and includes one or more intermediate measurement pairs at times between the first and second times.

42. The one or more computer-readable media as recited in claim 28, wherein the series of measurements includes at least eight intermediate measurement pairs.

43. The one or more computer-readable media as recited in claim 34, wherein the series of measurement pairs is taken over a time period of less than twenty microseconds.

44. The one or more computer-readable media as recited in claim 34, wherein the series of measurement pairs is taken over a time period between five and fifteen microseconds.

* * * * *